Oct. 14, 1947.  A. H. BASSETT  2,429,044
BEET TOPPER
Filed July 29, 1944  2 Sheets-Sheet 1
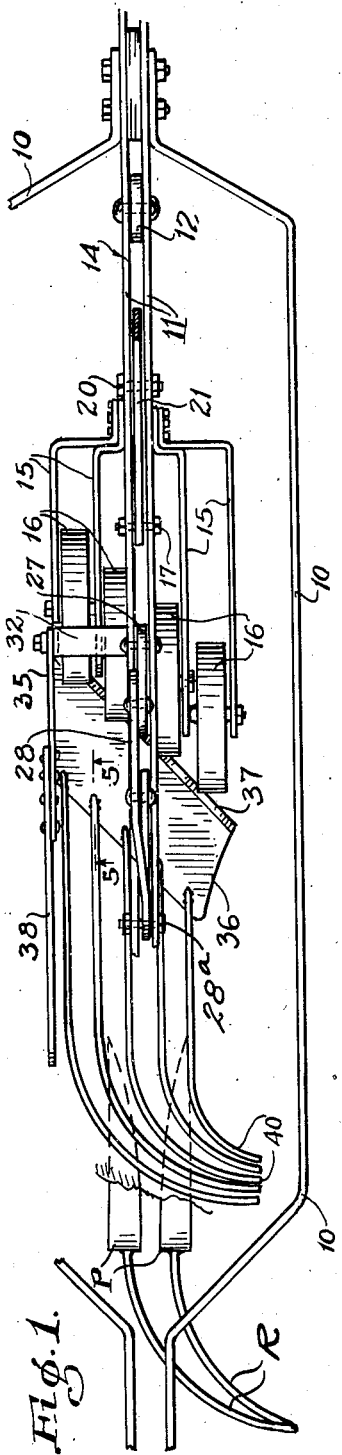
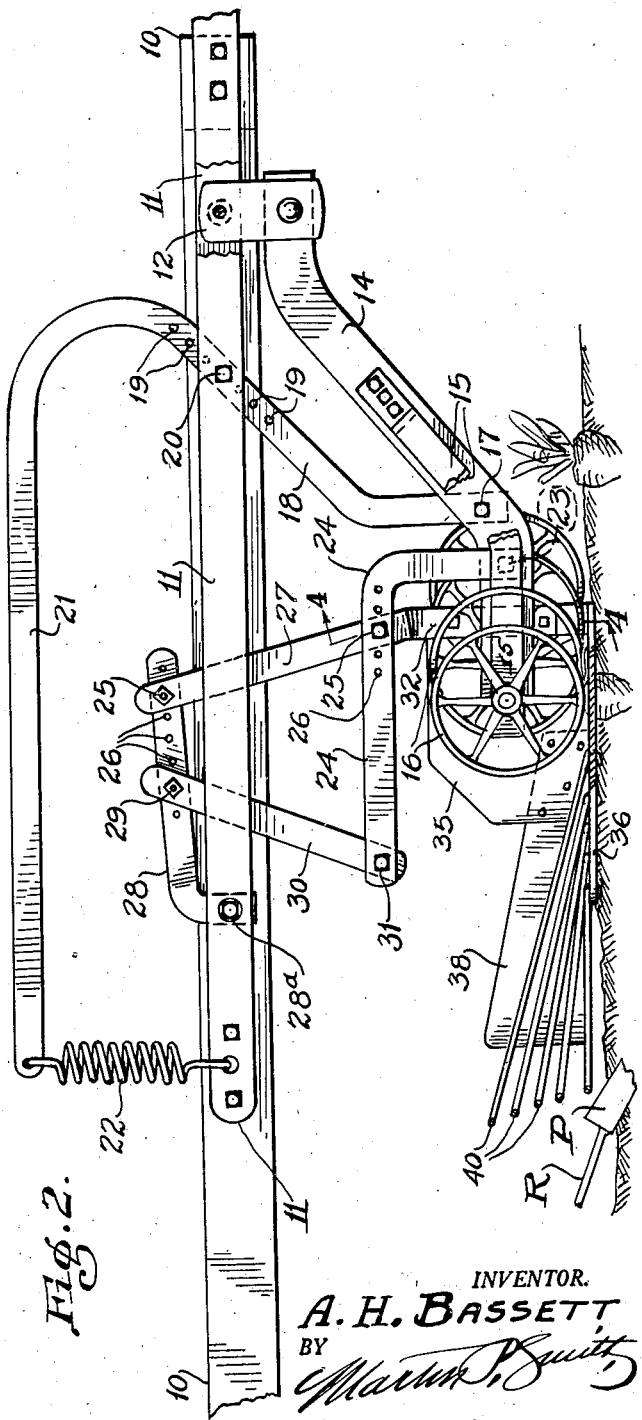
INVENTOR.
A. H. BASSETT
BY
ATTORNEY.

Oct. 14, 1947.  A. H. BASSETT  2,429,044
BEET TOPPER
Filed July 29, 1944  2 Sheets-Sheet 2
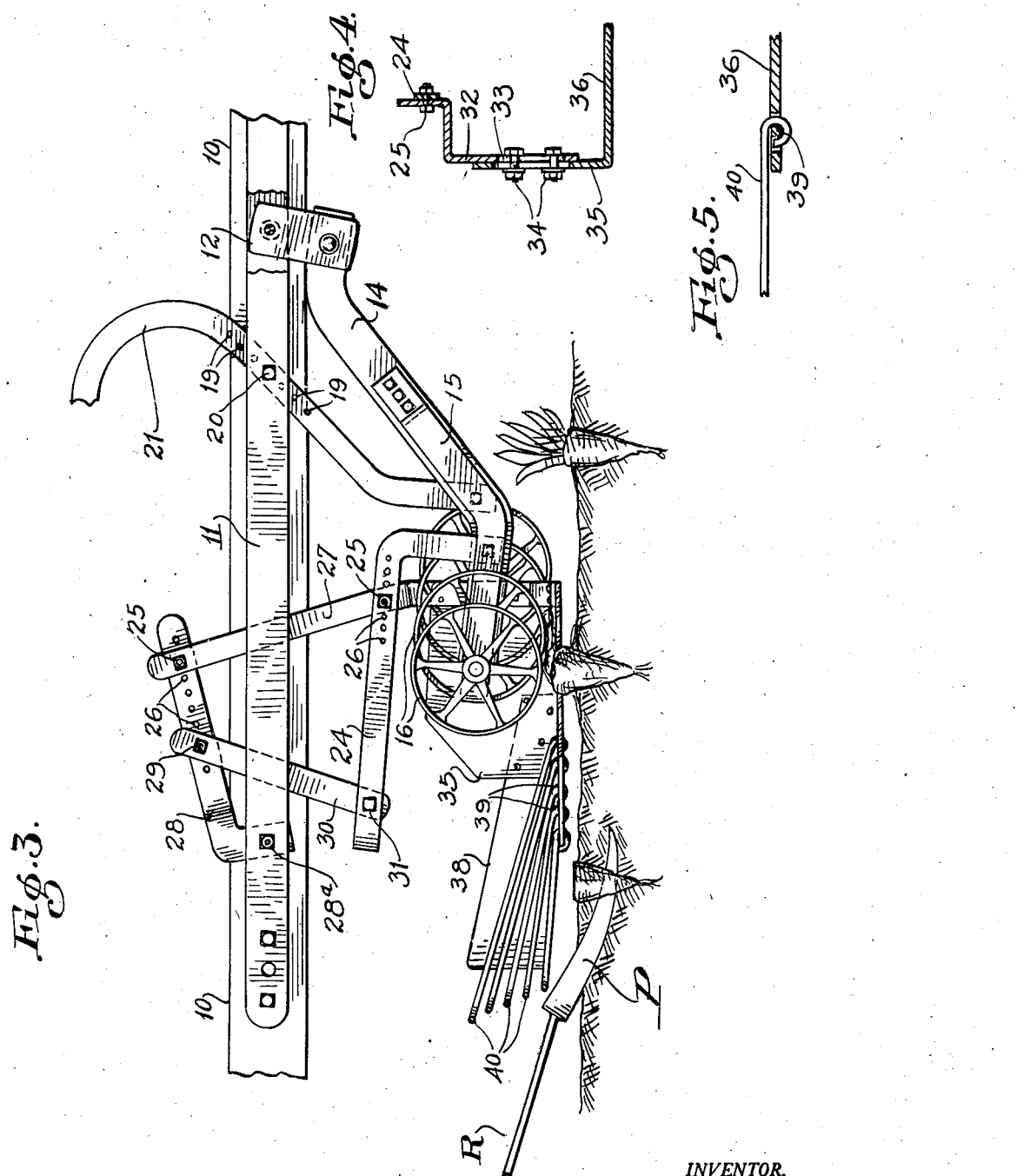
INVENTOR.
A. H. BASSETT
BY
ATTORNEY.

Patented Oct. 14, 1947

2,429,044

UNITED STATES PATENT OFFICE 2,429,044

BEET TOPPER

Appelton H. Bassett, Bell, Calif.

Application July 29, 1944, Serial No. 547,146

4 Claims. (Cl. 55—107)

My invention relates to a beet topper and has for its principal object, to provide a simple, strong, durable and inexpensive mechanical structure for effectively cutting and removing the tops of sugar beets, as the beet harvester, which carries the topping mechanism, travels along the rows of beets.

Beet crowns, from which the leaves grow, project different distances above the surface of the ground and to avoid the wasteful cutting of the crown or upper portions of the beet bodies, I propose to provide a topping mechanism including a knife, which is automatically raised and lowered so as to effect the cutting of the top or leaves in accordance with the height of the beet crowns above the ground surface, in other words, the height of beet crowns, above the surface of the ground, automatically and accurately regulates the elevation of the knife at the time of the cutting function.

Further objects of my invention are, to provide a beet topper of the character referred to, which may be readily associated with standard forms of beet harvesters; to provide a beet topper wherein the plane of cutting action is determined by a plurality of wheels which roll over the beets immediately in advance of the knife and further, to provide a simple means disposed to the rear of the knife for deflecting the cut beet tops, laterally and depositing same on the row over which the topper is travelling.

With the foregoing and other objects in view, my invention consists in certain novel features of construction and arrangement of parts which will be hereinafter more fully described and claimed and illustrated in the accompanying drawings in which:

Fig. 1 is a top plan view of a beet top cutting machine constructed in accordance with my invention.

Fig. 2 is a side elevational view of the topping machine.

Fig. 3 is a side elevational view of the topper and showing the positions of the wheels and knife while same are passing over a high crown beet.

Fig. 4 is a detail vertical section taken on the line 4—4 of Fig. 2.

Fig. 5 is an enlarged detail section taken on the line 5—5 of Fig. 1.

Referring by numerals to the accompanying drawings which illustrate a preferred embodiment of my invention, 10 designates the rear central portion of a conventional beet harvesting machine and mounted therein are longitudinally disposed parallel rails 11.

Pivotally suspended from the forward portions of rails 11 is a short hanger 12 and pivotally secured to the lower end of said hanger is the forward end of a rearwardly and downwardly extending arm 14 which carries the gauge wheels of the topping structure.

Secured to the central portion of arm 14 are the forward ends of a series of downwardly and rearwardly extending parallel bars 15.

Journalled on horizontal bearings between the rear portions of bars 15, are wheels 16 of uniform size and which are arranged in a transversely disposed inclined row.

Pivotally connected at 17 to the intermediate portion of arm 14, is the lower end of an upwardly and forwardly extending arm 18, the upper portion of which, is provided with a series of apertures 19, for the reception of a bolt 20 which passes through rail 11, thus enabling the axis of said arm 18 to be adjusted vertically on said rails.

From the upper end of arm 18, an arm or lever 21 extends for a considerable distance rearwardly over the rails 11 and to counterbalance the weight of arm 14 and parts carried thereby and to provide a resilient suspension therefor, the rear end of arm 21 is connected to the forward portions of rails 11, by a retractile coil spring 22.

Pivotally connected at 23 to arm 14 to the rear of pivot 17 is the lower end of the vertical arm of an inverted L-shaped member 24, the horizontal arm of which extends rearwardly over the wheels 16 and adjustably connected thereto by means of a bolt 25 which passes through any one of a series of apertures 26 in said member is a substantially upright arm 27.

The construction just described provides simple and convenient means for adjusting the knife or blade, hereinafter described, toward and away from wheels 16.

The forward end of arm 28 is pivotally connected at 28ª to rails 11 and adjustably connected to said arm in front of arm 27, by means of a bolt 29, is a substantially upright arm 30, the lower end of which is pivotally connected to the forward end of member 24 by a pin or bolt 31. Arms 27 and 30 converge toward their upper ends.

Immediately below member 24, the lower portion of arm 27 is extended outwardly over the left hand wheels 16 and thence downwardly to form a vertical arm 32 which is slotted as designated by 33 for the reception of bolts 34, which adjustably clamp to said arm, a plate 35 which extends upward from the forward left hand end of a horizontal blade 36. (See Fig. 4.)

This blade, which is transversely inclined, is positioned immediately behind the lower portions of wheels 16 so that the cutting edge 37 of said blade cuts through the crowns of the beets immediately after said wheels have passed over said crowns and the leaves projecting therefrom which latter are crushed forwardly by the wheels.

Secured to and projecting rearwardly from the lower rear portion of plate 35 is an upright deflector wall 38. Pivoted to swing on horizontal axes along the transversely inclined rear edge of blade 36 are the forward ends of conveyor rods 40 which extend rearwardly and slightly upward with their rear portions curved laterally toward the right hand, thus providing in effect, a conveyor chute for the tops cut from the beets, so that same are conveyed and discharged onto the ground immediately to the right of the row over which the topper is passing.

In operation, as the topper travels forward over a row of beets, wheels 16 will raise very little, if any, on passing over beet crowns which are flush with, or protrude only slightly above the surface of the ground and thus the following blade will, in removing the leaves or beet tops, cut away very little, if any of the crowns. On passing over high crown beets wheels 16 will correspondingly rise, thus swinging the rear end of arm 14 and parts carried thereby upward, thus correspondingly elevating the blade so as to cut the leaves from the tops of the crowns, with very little, if any losses from the beet bodies, due to low cutting through the crowns thereof.

Due to the linkage arrangement of the arms 24, 27, 28 and 30 the raise of the knife in passing over high crown beets, is directly proportional to the raise of the wheels in passing over such beets and as said arms are adjustably connected, the relative movement between the wheels and knife may be accurately controlled so that very little, if any of the beet bodies are removed when cutting the tops from low, medium or high crown beets, which is the prime desideratum of the invention.

As the topper moves forward with the harvester, the topped beets are lifted from the ground by conventional points or plows P and transferred to the side of the row, by curved rods R, which project rearwardly and laterally from said points.

Thus it will be seen that I have provided a beet topper which is simple in construction, inexpensive of manufacture and very effective in performing the functions for which it is intended.

It will be understood that minor changes in the size, form and construction of the various parts of my improved beet topper may be made and substituted for those herein shown and described without departing from the spirit of the invention, the scope of which is set forth in the appended claims.

I claim as my invention:

1. In a beet harvester, a support, an arm flexibly connected to said support and extending rearwardly and downwardly from its point of connection, a transversely inclined row of wheels mounted for operation on the lower rear portion of said arm, an arm having its lower forward end pivotally connected to said first mentioned arm and extending rearwardly above said wheels, a plate adjustably secured to the lower end portion of said second mentioned arm, a transversely inclined horizontally disposed blade secured at one end to said adjustable plate and positioned rearwardly of the lower portions of said wheels, a pair of arms pivotally connected to said second mentioned arm and extending upwardly therefrom and a horizontally disposed arm pivotally and adjustably connected to the upper ends of said pair of arms and pivotally connected to said support.

2. A beet harvester as set forth in claim 1 and one of which pair of upwardly projecting arms is adjustably connected to the rear portion of said second mentioned arm.

3. A beet harvester as set forth in claim 1, including a lever adjustably fulcrumed intermediate its ends on said support, the lower forward end of which lever is pivotally connected to the intermediate portion of said first mentioned arm and a retractile spring connecting the rear portion of said lever with said support, rearwardly from said horizontally disposed arm and pair of upwardly extending arms.

4. A beet harvester as set forth in claim 1, with a vertically deflector plate on the advance end of said blade, and a beet top conveyor secured to and projecting rearwardly and laterally from said blade.

APPELTON H. BASSETT.

REFERENCES CITED

The following references are of record in the file of this patent:

UNITED STATES PATENTS

| Number | Name | Date |
|---|---|---|
| 882,465 | Hanna | Mar. 17, 1908 |
| 1,096,695 | Deyl | May 12, 1914 |
| 2,212,751 | Powers | Aug. 27, 1940 |
| 2,231,793 | Braden | Feb. 11, 1941 |

FOREIGN PATENTS

| Number | Country | Date |
|---|---|---|
| 511,520 | France | Sept. 25, 1920 |